US012664873B2

(12) United States Patent
Cho

(10) Patent No.: US 12,664,873 B2
(45) Date of Patent: Jun. 23, 2026

(54) FIRE ALARM DEVICE INSPECTION METHOD AND FIRE ALARM DEVICE

(71) Applicant: ROZETATECH Co., Ltd., Gyeonggi-do (KR)

(72) Inventor: Youngjin Cho, Chungcheongbuk-do (KR)

(73) Assignee: ROZETATECH Co., Ltd., Seongnam-si (KR)

( * ) Notice: Subject to any disclaimer, the term of this patent is extended or adjusted under 35 U.S.C. 154(b) by 200 days.

(21) Appl. No.: 18/697,862

(22) PCT Filed: Oct. 18, 2022

(86) PCT No.: PCT/KR2022/015849
§ 371 (c)(1),
(2) Date: Oct. 8, 2024

(87) PCT Pub. No.: WO2023/068751
PCT Pub. Date: Apr. 27, 2023

(65) Prior Publication Data

US 2025/0252846 A1 Aug. 7, 2025

(30) Foreign Application Priority Data

Oct. 18, 2021 (KR) ........................ 10-2021-0138447

(51) Int. Cl.
*G08B 29/00* (2006.01)
*G08B 29/12* (2006.01)

(52) U.S. Cl.
CPC .................................... *G08B 29/12* (2013.01)

(58) Field of Classification Search
CPC .... G08B 29/12; G08B 29/145; G08B 25/009; G08B 17/06; G08B 25/10; G08B 25/14
(Continued)

(56) References Cited

U.S. PATENT DOCUMENTS 9,420,624 B2 8/2016 Chung et al.
2005/0190055 A1* 9/2005 Petite .................... G08B 17/10 340/506

(Continued)

FOREIGN PATENT DOCUMENTS

JP 2016192047 11/2016
KR 20130138552 12/2013

(Continued)

OTHER PUBLICATIONS

International Preliminary Report on Patentability issued Apr. 23, 2024, from International Application No. PCT/KR2022/015849, filed on Oct. 18, 2022. 11 pages.

(Continued)

*Primary Examiner* — Anh V La
(74) *Attorney, Agent, or Firm* — HoustonHogle LLP

(57) ABSTRACT

A fire alarm apparatus according to an embodiment of the present invention may include a plurality of first detectors, each first detector detecting an occurrence of a fire and each first detector being activated at every first time, a plurality of second detectors, each second detector detecting the occurrence of the fire and each second detector being activated at every second time different from the first time, a repeater, a receiver, and a first server, and in the checking mode, the receiver may transmit a checking signal to the plurality of first detectors or the plurality of second detectors and activated detectors among the plurality of first detectors and the plurality of second detectors may receive the checking signal and transmit a response signal to the receiver.

18 Claims, 4 Drawing Sheets

(58) Field of Classification Search
USPC .......................... 340/506, 531, 628, 501, 500
See application file for complete search history.

(56) References Cited

U.S. PATENT DOCUMENTS

| | | | | |
|---|---|---|---|---|
| 2007/0241879 | A1* | 10/2007 | Jobe | G08B 25/14 340/506 |
| 2015/0061877 | A1* | 3/2015 | Kates | H04B 1/69 340/628 |
| 2015/0187194 | A1* | 7/2015 | Hypolite | G08B 17/10 340/628 |
| 2023/0343203 | A1 | 10/2023 | Cho | |
| 2023/0368650 | A1 | 11/2023 | Cho | |

FOREIGN PATENT DOCUMENTS

| | | |
|---|---|---|
| KR | 102160560 | 9/2020 |
| KR | 102188138 | 12/2020 |
| KR | 102289216 | 8/2021 |

OTHER PUBLICATIONS

International Search Report of the International Searching Authority, mailed on Jan. 20, 2023, from International Application No. PCT/KR2022/015849, filed on Oct. 18, 2022. 5 pages.
Written Opinion of the International Searching Authority, mailed on Jan. 20, 2023, from International Application No. PCT/KR2022/015849, filed on Oct. 18, 2022. 4 pages.

* cited by examiner

FIRE ALARM DEVICE INSPECTION METHOD AND FIRE ALARM DEVICE

RELATED APPLICATIONS

This application is a § 371 National Phase Application of International Application No. PCT/KR2022/015849, filed on Oct. 18, 2022, now International Publication No. WO/2023/068751, published on Apr. 27, 2023, which International Application claims priority to Republic of Korea Application 10-2021-0138447, filed on Oct. 18, 2021, both of which are incorporated herein by reference in their entirety.

TECHNICAL FIELD

The present invention relates to a fire alarm apparatus checking method and a fire alarm apparatus with improved reliability.

BACKGROUND ART

In general, a detector transmits and receives a checking signal to and from a repeater by a communication state check. For continuous checking of a communication state, the detector may be switched from a standby state to an active state to transmit and receive a signal to and from the repeater. However, among detectors, a detector that does not require checking by the checking signal may also operate. In this case, a loss of battery power may occur. The detector may be turned off due to the loss of battery power in the detector. In this case, users may be exposed to the risk of fire even if a fire actually occurs in a zone where a fire alarm apparatus is installed.

DISCLOSURE OF THE INVENTION

Technical Problem

An object of the present invention is to provide a fire alarm apparatus checking method and a fire alarm apparatus with improved reliability.

Technical Solution

A fire alarm apparatus according to an embodiment of the present invention may include a plurality of first detectors, each first detector detecting an occurrence of a fire and each first detector being activated at every first time, a plurality of second detectors, each second detector detecting the occurrence of the fire and each second detector being activated at every second time different from the first time, a repeater that performs communication with the plurality of first detectors and the plurality of second detectors, a receiver that performs the communication with the repeater and operates in a checking mode, and a first server that performs the communication with the receiver, and, in the checking mode, the receiver may transmit a checking signal to the plurality of first detectors or the plurality of second detectors and activated detectors among the plurality of first detectors and the plurality of second detectors may receive the checking signal and transmit a response signal to the receiver.

Each of the plurality of first detectors may include a first synchronization circuit, each of the plurality of second detectors may include a second synchronization circuit, and the receiver may include a synchronization circuit.

An internal time of each of the first synchronization circuit, the second synchronization circuit, and the synchronization circuit may be synchronized based on a synchronization signal.

The first time and the second time may be counted based on the internal time.

Each of the plurality of first detectors may be simultaneously activated at every first time based on the internal time, and each of the plurality of second detectors may be simultaneously activated at every second time based on the internal time.

The checking mode may operate based on an external signal provided to the receiver.

The plurality of first detectors and the plurality of second detectors may operate in the same frequency band.

A fire alarm apparatus checking method according to an embodiment of the present invention may include a step in which a plurality of first detectors are activated at every first time, a step in which a plurality of second detectors are activated at every second time different from the first time, and a step in which a receiver operates in a checking mode, and the step in which the receiver operates in the checking mode may include a step in which the receiver transmits a checking signal to the plurality of first detectors or the plurality of second detectors, and a step in which activated detectors of the plurality of first detectors and the plurality of second detectors receive the checking signal and transmit a response signal to the receiver.

A step in which internal times of the plurality of first detectors, the plurality of second detectors, and the receiver are synchronized may be further included.

A step in which the first time is counted based on the internal time and a step in which the second time is counted based on the internal time may be further included.

The step in which the plurality of first detectors are activated at every first time may include a step in which the plurality of first detectors are simultaneously activated at every first time based on the internal time, and the step in which the plurality of second detectors are activated at every first time may include a step in which the plurality of second detectors are simultaneously activated at every second time based on the internal time.

The step in which the receiver operates in the checking mode may include a step in which the checking mode is activated based on a signal provided from the outside.

Advantageous Effects

According to the matters described above, the unnecessary loss of battery power of the plurality of detectors can be prevented. The battery time of a battery unit of each of the plurality of detectors can be improved. It is possible to provide the fire alarm apparatus checking method that can prevent each of the plurality of detectors from turning off at the moment of need and has improved reliability, and a fire alarm apparatus using the same.

MODE FOR CARRYING OUT THE INVENTION

Figure 1:
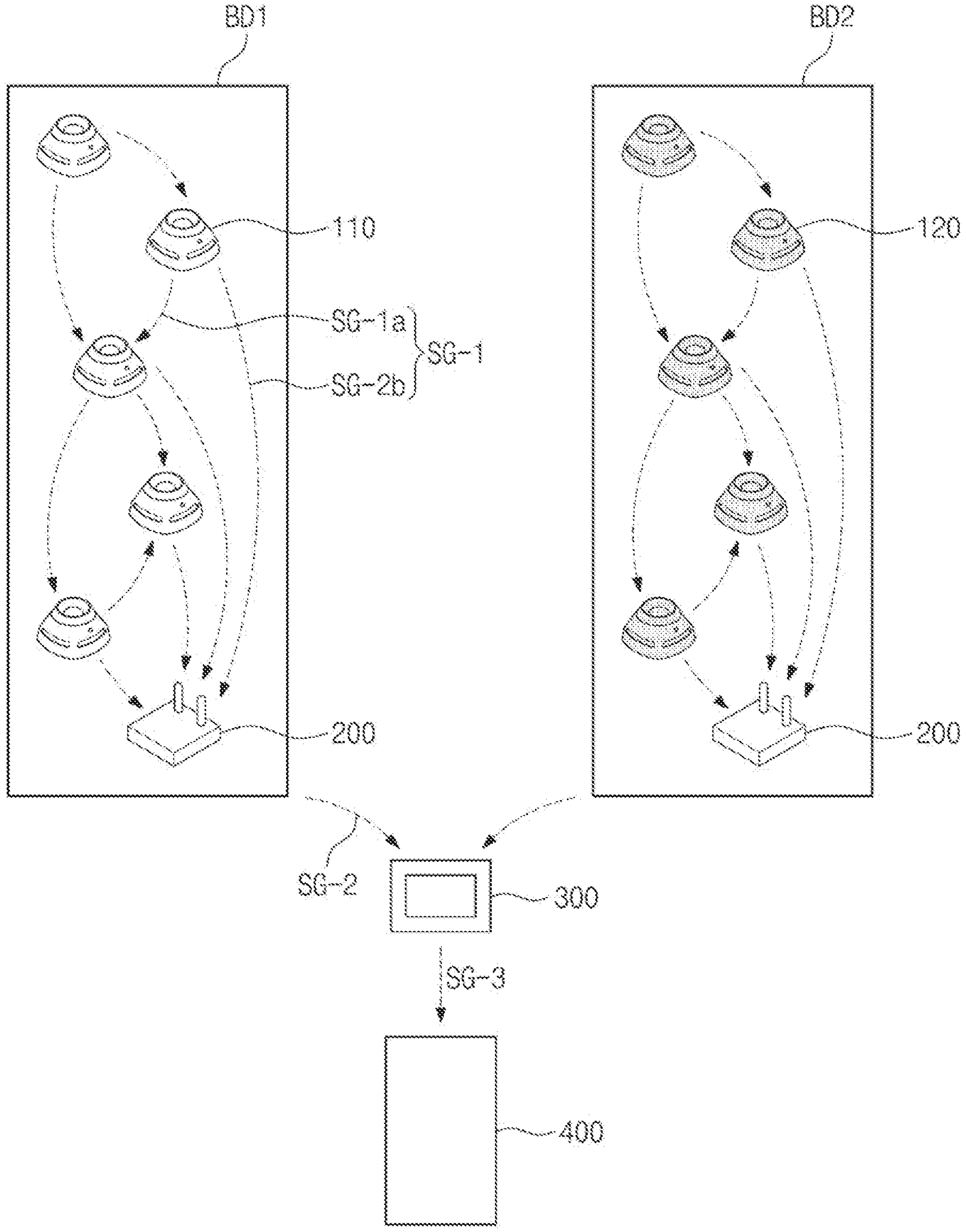
FIG. 1 illustrates a fire alarm apparatus according to an embodiment of the present invention.

In this specification, when a constituent element (or region, layer, portion, etc.) is referred to as being "located on," "connected to," or "coupled to" another constituent element, it means that the constituent element may be disposed/connected/coupled directly on another constituent element or that a third constituent element may be disposed between them.

The same reference numeral refers to the same constituent element. In addition, in the drawings, the thickness, proportion, and dimensions of constituent elements are exaggerated for effective explanation of technical content. The term "and/or" includes all of one or more combinations that the associated configurations can define.

Terms such as first, second, etc. may be used to describe various constituent elements, but the constituent elements should not be limited by the terms. The terms are used only for the purpose of distinguishing one constituent element from another constituent element. For example, a first constituent element may be referred to as a second constituent element, and similarly, the second constituent element may also be referred to as the first constituent element without departing from the scope of the present invention. Singular expressions include plural expressions unless the context clearly indicates otherwise.

In addition, terms such as "below," "on the lower side," "above," and "on the upper side" are used to describe the relationship between the constituent elements illustrated in the drawings. The terms are relative conceptual terms and are described based on the direction indicated in the drawings.

Terms such as "include" or "have" are intended to designate the existence of features, numbers, steps, operations, constituent elements, parts, or combinations thereof described in the specification, and should be understood as not precluding the existence or addition possibility of one or more other features, numbers, steps, operations, constituent elements, parts, or combinations thereof.

Unless otherwise defined, all terms (including technical terms and scientific terms) used in this specification have the same meaning as commonly understood by a person skilled in the art to which the present invention pertains. In addition, terms such as those defined in commonly used dictionaries should be interpreted as having meanings consistent with their meanings in the context of the relevant technology, and should not be interpreted in an overly idealistic or overly formal sense unless explicitly defined herein.

Hereinafter, embodiments of the present invention will be described with reference to the drawings.

FIG. 1 illustrates a fire alarm apparatus according to an embodiment of the present invention.

Referring to FIG. 1, the fire alarm apparatus may detect a fire situation. The fire alarm apparatus may include a plurality of first detectors 110, a plurality of second detectors 120, a repeater 200, a receiver 300, and a first server 400.

The fire alarm apparatus may include a plurality of sets, each of which contains detectors. In FIG. 1, two sets are exemplarily illustrated. For example, FIG. 1 illustrates the fire alarm apparatus including the plurality of first detectors 110 and the plurality of second detectors.

The plurality of first detectors 110 may be installed in a first building BD1. The plurality of second detectors 120 may be installed in a second building BD2. Although FIG. 1 exemplarily illustrates five detectors installed in one building, the number of detectors according to an embodiment of the present invention is not limited thereto. For example, a thousand detectors may be installed in one building.

Each of the plurality of first detectors 110 and each of the plurality of second detectors 120 may detect the occurrence of a fire. Each of the plurality of first detectors 110 and each of the plurality of second detectors 120 may transmit a first fire detection signal SG-1 to adjacent detectors and/or the repeater 200.

The first fire detection signal SG-1 may include a first signal SG-1*a* and a second signal SG-1*b*. The first signal SG-1*a* may be a signal generated by the detectors 110 and 120 that detect the occurrence of a fire. The second signal SG-1*b* may be a signal amplified by the detectors 110 and 120.

A radio frequency (RF) communication method may be used as a method of transmitting and receiving the first fire detection signal SG-1. The RF communication method may be a communication method that exchanges information by radiating radio frequencies. The RF communication method is a broadband communication method using frequencies and may have high stability due to low influence of climate and environment. The RF communication method may link voice or other additional functions and may have a high transmission speed. For example, the RF communication method may use frequencies in the 447 MHz to 924 MHz band. However, this is an example, and in one embodiment of the present invention, communication methods such as Ethernet, Wifi, LoRA, M2M, 3G, 4G, LTE, LTE-M, Bluetooth, and WiFi Direct may be used.

Each of the plurality of first detectors 110 and each of the plurality of second detectors 120 may operate in the same frequency band.

In one embodiment of the present invention, the RF communication method may include a listen before transmission (LBT) communication method. This method is a frequency selection method that determines whether a selected frequency is being used by another system, and reselects another frequency when it is determined to be occupied. For example, a node intending to transmit may first listen to a medium, determine whether it is in an idle state, and then send a backoff protocol before transmitting. By distributing data using this LBT communication method, collisions between signals in the same band can be prevented.

The repeater 200 may perform RF communication with the plurality of first detectors 110 and the plurality of second detectors 120, respectively. The repeater 200 may receive the first fire detection signal SG-1 from the plurality of first detectors 110 and the plurality of second detectors 120. The repeater 200 may convert the first fire detection signal SG-1 into a second fire detection signal SG-2. The repeater 200 may transmit the second fire detection signal SG-2 to the receiver 300.

The RF communication method may be used as a method of transmitting the second fire detection signal SG-2. That is, the repeater 200 and the receiver 300 may perform the RF communication.

The receiver 300 may receive the second fire detection signal SG-2 from the repeater 200. The receiver 300 may convert the second fire detection signal SG-2 into a third fire detection signal SG-3). The receiver 300 may transmit the third fire detection signal SG-3 to the first server 400.

The receiver 300 may check a connection state of each of the plurality of first detectors 110 and each of the plurality of second detectors 120 through a checking mode. The plurality of first detectors 110, the plurality of second detectors 120, and the receiver 300 may be time-synchronized with each other. This will be described later.

The RF communication method may be used as a method of transmitting the third fire detection signal SG-3. That is, the receiver 300 and the first server 400 may perform the RF communication.

The first server 400 may determine the fire situation based on the third fire detection signal SG-3 received from the receiver 300. The first server 400 may determine the validity of the third fire detection signal SG-3.

The first server 400 may receive big data from an external second server. The big data may be stored in a memory of the second server. However, this is an example, and the big data according to an embodiment of the present invention may be stored in a server memory of the first server 400.

The big data may include surrounding environmental data for determining whether or not a fire has occurred. For example, the surrounding environment data may include at least one of data corresponding to the probability of fire occurrence by date, data corresponding to the probability of fire occurrence by time, data corresponding to the probability of fire occurrence by space, data corresponding to the probability of fire occurrence by temperature, data corresponding to the probability of fire occurrence by humidity, data corresponding to the probability of fire occurrence by weather, data corresponding to the probability of fire occurrence by industry, and data corresponding to the probability of fire occurrence for each user.

For example, the data corresponding to the probability of fire occurrence by date may include the probability of fire occurrence by day of the week, and the probability of fire occurrence by month. The data corresponding to the probability of fire occurrence by time may include the probability of fire occurrence classified by dawn, morning, afternoon, evening, or late night. The data corresponding to the probability of fire occurrence by space may include the probability of fire occurrence classified by urban areas, mountainous regions, beaches, or rural areas. The data corresponding to the probability of fire occurrence by temperature may include the probability of fire occurrence classified by spring, summer, fall, or winter. The data corresponding to the probability of fire occurrence by humidity may include a fire index by specific humidity level. The data corresponding to the probability of fire occurrence by weather may include the probability of fire occurrence classified by clear days, cloudy days, or rainy days. The data corresponding to the probability of fire occurrence by industry may include the probability of fire occurrence classified by homes, restaurants, factories, or offices. The probability of fire occurrence for each user may include the probability of fire occurrence classified by age, occupation, or gender.

The big data may be updated periodically.

Figure 2:
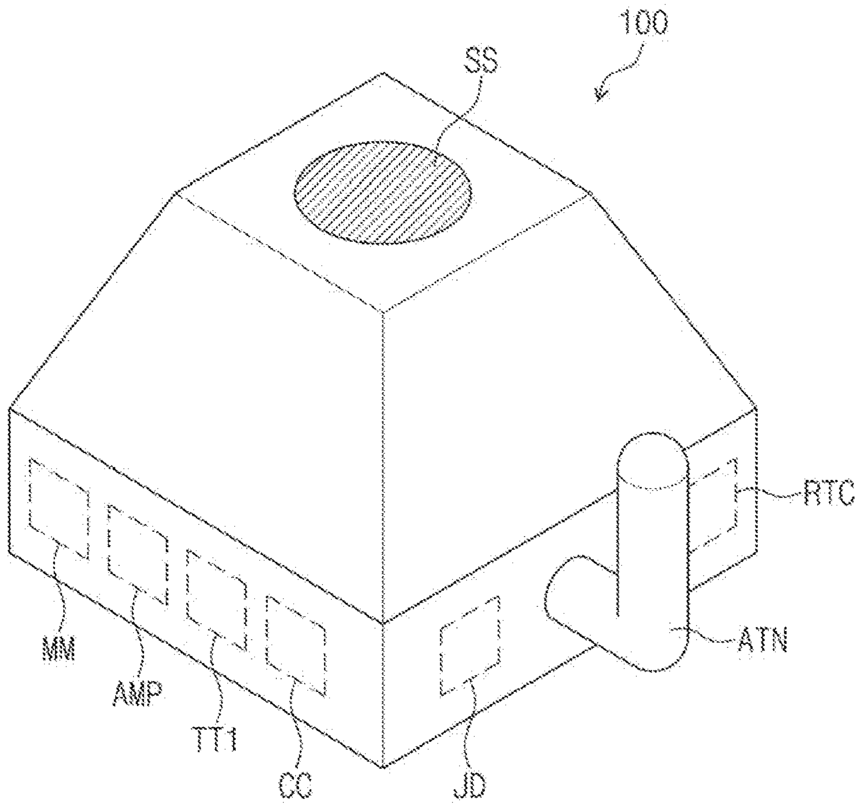
FIG. 2 is a perspective view illustrating one detector among a plurality of detectors according to an embodiment of the present invention.

FIG. 2 is a perspective view illustrating one detector among a plurality of detectors according to an embodiment of the present invention.

Referring to FIGS. 1 and 2, each of the plurality of detectors 110 and 120 may include different unique address information. One detector 110 of the plurality of detectors 110 and 120 may include a sensor SS, a sensing memory MM, a sensing communication unit ATN, an amplification unit AMP, a battery unit TT1, and a synchronization circuit RTC1.

The sensor SS may detect at least one of smoke, temperature, humidity, and gas. The sensor SS may generate fire information by detecting at least one of smoke, temperature, humidity, and gas. The fire information may include a value measured by the sensor SS. In FIG. 2, although one sensor SS is illustrated as an example, the present invention is not limited thereto. For example, the detector 100 may include a plurality of sensors, and each of the plurality of sensors may detect at least one of smoke, temperature, humidity, and gas.

Information about the sensor SS may be stored in the sensing memory MM. The detector 100 may automatically determine a modulation method for the signal generated by the mounted sensor SS through the information stored in the sensing memory MM. Through this automatic modulation method, the detector 100 may easily transmit the fire detection signal SG-1 no matter what types of sensors are mounted.

The address information may be stored in the sensing memory MM. An optimal signal transmission path for quickly transmitting the fire detection signal SG-1 to the repeater 200 may be stored in the sensing memory MM.

The sensing memory MM may include a volatile memory or a non-volatile memory. The volatile memory may include a DRAM, SRAM, flash memory, or FeRAM. The non-volatile memory may include an SSD or HDD.

The sensing communication unit ATN may transmit the fire detection signal SG-1 to the repeater 200. The sensing communication unit ATN may transmit the fire detection signal SG-1 to other adjacent sensing units SM. The fire detection signal SG-1 may include the fire information generated by the sensor SS and the address information.

When the sensing communication unit ATN receives a fire occurrence signal from the sensor SS, it may transmit the first signal SG-1*a* to at least one of the plurality of adjacent sensing units SM. When the sensing communication unit ATN receives the fire occurrence signal from the sensor SS, it may transmit the second signal SG-1*b* to the repeater 200.

When the detector 100 and the repeater 200 are far away from each other and it is difficult for the repeater 200 to directly receive the fire detection signal SG-1, the sensing communication unit ATN may stably perform signal transmission to the repeater 200 by transmitting the fire detection signal SG-1 to another adjacent detector 100. The sensing communication unit ATN may receive the fire detection signal SG-1 from another adjacent detector 100.

The amplification unit AMP may amplify the fire detection signal SG-1. The sensing communication unit ATN may receive the fire detection signal SG-1 from another detector 100. The transmission rate and/or accuracy of the received fire detection signal SG-1 may be reduced due to the transmission distance and noise in the process of receiving the signal SG-1 from another adjacent detector 100. The amplification unit AMP may amplify the fire detection signal SG-1 of which quality is deteriorated. Accordingly, the transmission rate and/or accuracy of the fire detection signal SG-1 can be improved. The sensing communication unit ATN may transmit the amplified fire detection signal SG-1 to the repeater 200. The sensing communication unit ATN may transmit the amplified fire detection signal SG-1 to at least one of the plurality of adjacent detectors 100. The amplified fire detection signal SG-1 may increase the accuracy, transmission rate, and transmission distance of the signal transmitted between the plurality of detectors 100 and the repeater 200.

The amplified fire detection signal SG-1 according to an embodiment of the present invention may be transmitted to another adjacent detector 100 and amplified again in the amplification unit AMP of the other adjacent detector 100.

According to the present invention, the plurality of detectors 100 may stably transmit data to the plurality of detectors 100 and the repeater 200 using the amplification unit AMP. Accordingly, the reliability of the plurality of detectors 100 can be improved.

The battery unit TT1 may supply power to the sensor SS, the sensing memory MM, the sensing communication unit ATN, the amplification unit AMP, and the synchronization circuit RTC1.

The sensing communication unit ATN according to an embodiment of the present invention may use the RF communication method. The RF communication method may consume less power. Power usage of the detector 100 can be minimized. The detector 100 can be driven with low power. Accordingly, the battery unit TT1 may stably supply power to the sensor SS, the sensing memory MM, the sensing communication unit ATN, the amplification unit AMP, and the synchronization circuit RTC1 for a long time.

In addition, according to the present invention, the plurality of sensing units SM may operate by being classified into a power saving state and an active state that consume little power, thereby minimizing power use of each of the plurality of detectors 100. Accordingly, each of the plurality of detectors 100 can be driven at low power.

The synchronization circuit RTC1 may receive a synchronization signal from the receiver 300. Based on the synchronization signal, the synchronization circuit RTC1 may synchronize the internal time. The synchronization circuit RTC1 may be synchronized with the time of a synchronization circuit RTC2 (see FIG. 3) of the receiver 300. This will be described later.

Figure 3:
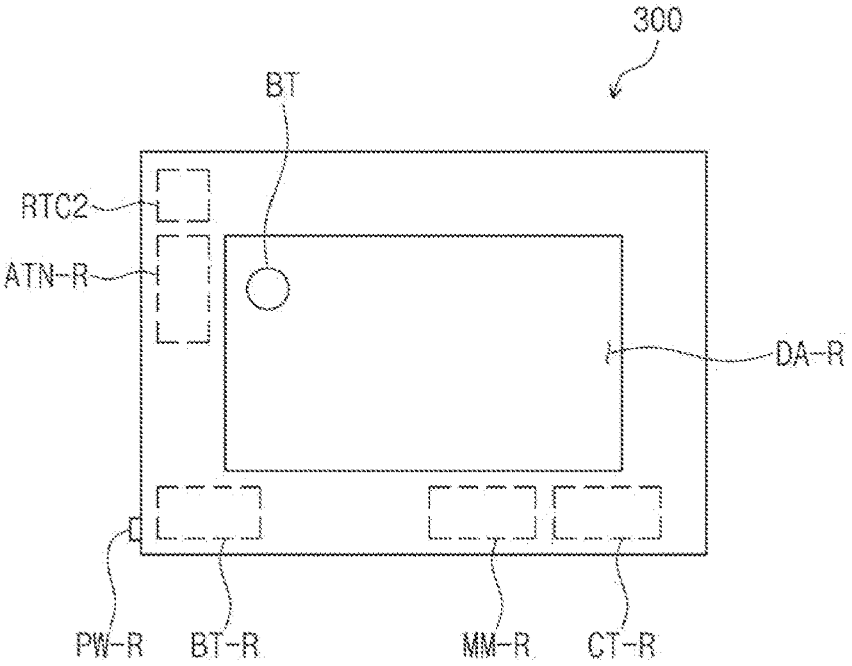
FIG. 3 illustrates a receiver according to an embodiment of the present invention.

FIG. 3 illustrates a receiver according to an embodiment of the present invention.

Referring to FIGS. 1 and 3, the receiver 300 may receive the second fire detection signal SG-2 from a plurality of repeaters 200.

The receiver 300 may include a communication unit ATN-R, a power unit PW-R, a battery unit BT-R, a memory MM-R, a control unit CT-R, a synchronization circuit RTC2, and a display unit DA-R.

The communication unit ATN-R may communicate with the repeater 200 and the server 400. The communication unit ATN-R may receive a second fire detection signal SG-2*a* from the repeater 200. The communication unit ATN-R may transmit a response signal SG-2*b* to the repeater 200. The communication unit ATN-R and the communication unit ATN-G (see FIG. 3) of the repeater 200 may communicate wirelessly through RF communication. The communication unit ATN-R may transmit a third fire detection signal SG-3 to the server 400. The communication unit ATN-R may communicate wirelessly with a server transmission unit ATN-B (see FIG. 5) of the server 400 through RF communication.

The power unit PW-R may receive first power from the outside. The first power may supply power to the communication unit ATN-R, the memory MM-R, the control unit CT-R, and the display unit DA-R.

The battery unit BT-R may supply second power. The second power may supply power to the communication unit ATN-R, the memory MM-R, the control unit CT-R, and the display unit DA-R.

According to the present invention, the battery unit BT-R may enable the receiver 300 to operate by supplying the second power even if the first power supplied from the power unit PW-R is cut off due to a power outage or the like. The receiver 300 may stably receive the second fire detection signal SG-2 from the repeater 200, stably transmit the response signal, and stably transmit the third fire detection signal SG-3 to the server 400. Accordingly, the reliability of signal transmission can be improved.

Address information of each of the plurality of sensing units SM may be stored in the memory MM-R. Location information of each of the plurality of sensing units SM may be stored in the memory MM-R based on the address information.

The display unit DA-R may provide image information corresponding to a state of the plurality of sensing units SM or a state of the repeater 200. The display unit DA-R may include a liquid crystal display panel or an organic light emitting display panel. The display unit DA-R may receive input from the outside provided by the user. For example, the display unit DA-R may further include a touch unit.

The control unit CT-R may control each of the plurality of sensing units SM. The user may provide input to the display unit DA-R to allow the control unit CT-R to control each of the plurality of sensing units SM. For example, the control unit CT-R may control information about a place where each of the plurality of sensing units SM is disposed, information about a type of value sensed by each of the plurality of sensing units SM, and/or information about whether or not each of the plurality of sensing units SM operates normally.

The receiver 300 may control the plurality of sensing units SM disposed in various places through the repeater 200.

The synchronization circuit RTC2 may transmit a synchronization signal to each of the plurality of detectors 110 and 120. Based on the synchronization signal, the internal time of the synchronization circuit RTC1 (see FIG. 2) of each of the plurality of detectors 110 and 120 and the internal time of the synchronization circuit RTC2 may be synchronized.

An external signal may be provided to the receiver 300 through a screen of the display unit DA-R. The user can operate a button BT displayed on the display unit DA-R. The receiver 300 may operate in the checking mode based on the button BT. The checking mode will be described later.

Figure 4:
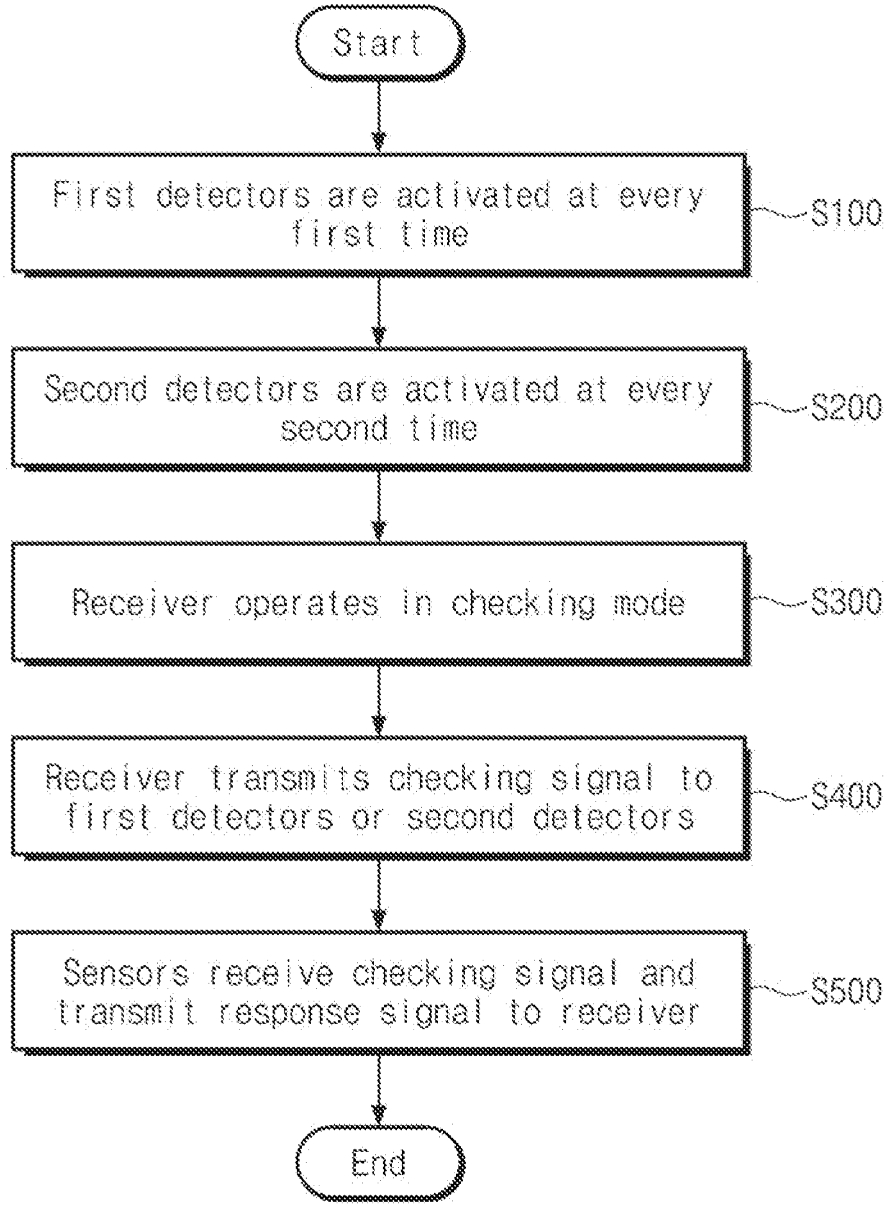
FIG. 4 is a flowchart illustrating a fire alarm apparatus checking method according to an embodiment of the present invention.
Figure 5:
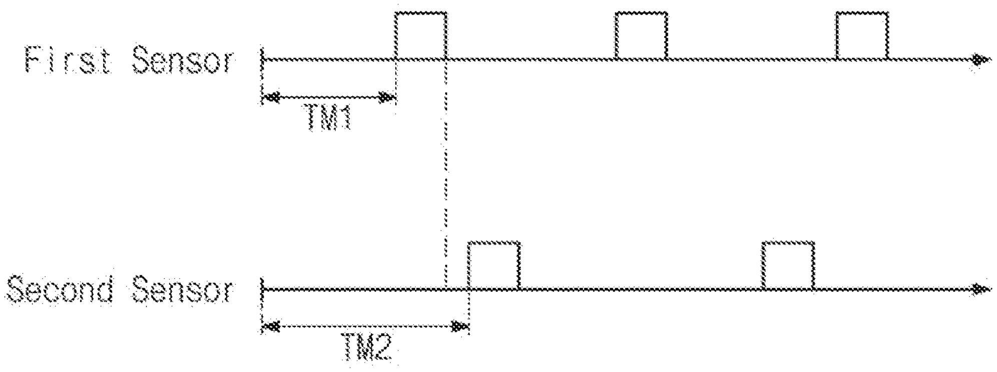
FIG. 5 illustrates the operation of detectors according to an embodiment of the present invention.
Figure 6:
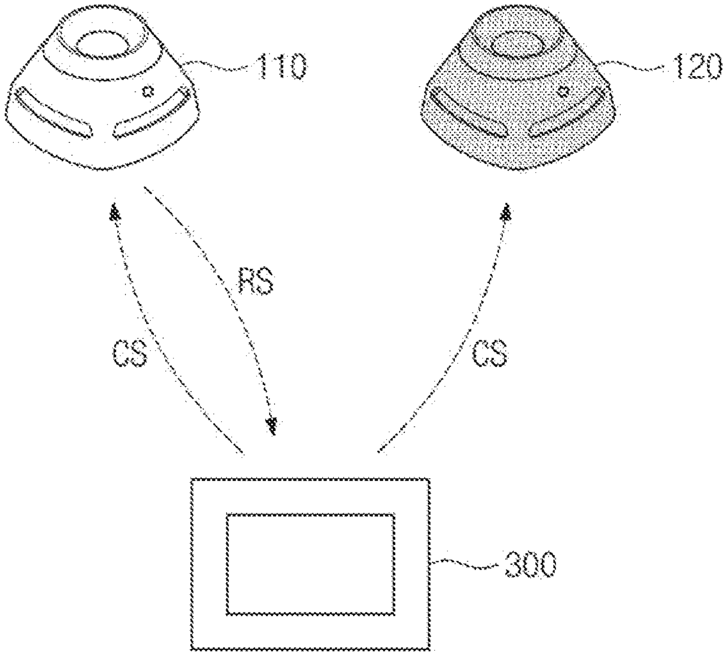
FIG. 6 schematically illustrates a fire alarm apparatus according to an embodiment of the present invention.

FIG. 4 is a flowchart illustrating a fire alarm apparatus checking method according to an embodiment of the present invention, FIG. 5 illustrates the operation of detectors according to an embodiment of the present invention, and FIG. 6 schematically illustrates a fire alarm apparatus according to an embodiment of the present invention.

Referring to FIGS. 4 to 6, the synchronization circuit RTC2 (see FIG. 3) of the receiver 300 may transmit and receive a synchronization signal to and from the synchronization circuit RTC1 (see FIG. 2) of each of the plurality of first detectors 110 and the plurality of second detectors 120. The internal times of the plurality of first detectors 110, the plurality of second detectors 120, and the receiver 300 may be synchronized.

The plurality of first detectors 110, the plurality of second detectors 120, and the receiver 300 may transmit and receive synchronization signals at each predetermined period. With this, the synchronization circuit included in each of the first detectors 110, the second detectors 120, and the receiver 300 does not have an error of 0.1 seconds or more in 24 hours.

Each of the plurality of first detectors 110 may be activated at every first time TM1 (S100). The plurality of first detectors 110 may detect a checking signal CS at every first time TM1. Each of the plurality of first detectors 110 may detect the checking signal CS for a predetermined time. The predetermined time may be 2 to 6 milliseconds. For example, the predetermined time may be 4 milliseconds.

The first time TM1 may be counted based on the synchronized internal time. Each of the plurality of first detectors 110 may be simultaneously activated at every first time TM1 based on the internal time. That is, the plurality of first detectors 110 may be converted to an activated state in order to detect the checking signal CS at every first time TM1. For example, the first time TM1 may be 6 seconds.

Each of the plurality of second detectors 120 may be activated at every second time TM2 (S200). The plurality of second detectors 120 may detect the checking signal CS at every second time TM2. Each of the plurality of second detectors 120 may detect the checking signal CS for a predetermined time. The predetermined time may be 2 to 6 milliseconds. For example, the predetermined time may be 4 milliseconds.

The second time TM2 may be different from the first time TM1. The second time TM2 may be counted based on the internal time. Each of the plurality of second detectors 120 may be simultaneously activated at every second time TM2 based on the internal time. That is, the plurality of second detectors 120 may be converted to an activated state in order to detect the checking signal CS at every second time TM2. For example, the second time TM2 may be 6.1 seconds.

For example, counting of the second time TM2 may not overlap with counting of the first time TM1. Accordingly, the time at which the plurality of first detectors 110 are activated and the time at which the plurality of second detectors 120 are activated do not overlap with each other and may be activated independently.

The receiver 300 may operate in the checking mode (S300). The checking mode may be activated based on a signal provided from outside. For example, a user may conduct checking of the fire alarm apparatus at any time. The user may activate the checking mode through the button BT displayed on the display unit DA-R (see FIG. 3) of the receiver 300.

The receiver 300 may transmit the checking signal CS to the plurality of first detectors 110 or the plurality of second detectors 120 (S400).

Detectors that have transmitted the checking signal CS among the plurality of first detectors 110 and the plurality of second detectors 120 may transmit a response signal RS to the receiver 300 (S500). That is, among the plurality of first detectors 110 and the plurality of second detectors 120, the detectors activated at the time the receiver 300 transmits the checking signal CS may transmit the response signal RS to the receiver 300.

The sensors 110 and 120 installed in each of the dense buildings may be checked whether they are operating normally by the checking signal CS of the receiver 300. The user may check the communication state between the plurality of second detectors 120 and the receiver 300 or between the plurality of second detectors 120 and the receiver 300, by applying a signal so as to operate the receiver 300 in the checking mode.

Unlike the present invention, each of the detectors installed in each dense building can be activated at every predetermined time. In this case, the user may check whether the plurality of first detectors 110 installed in the first building BD1 (see FIG. 1) are operating normally. The receiver 300 may transmit the checking signal CS. In this case, the plurality of second detectors 120 installed in the second building BD2 (see FIG. 2) may also be activated at every predetermined time. Some first detectors among the plurality of first detectors 110 and some second detectors among the plurality of second detectors 120 may be simultaneously activated. Each of the activated plurality of second detectors 120 may recognize the checking signal CS and transmit the response signal RS. The user has attempted to check the plurality of first detectors 110 installed in the first building BD1 (see FIG. 1), but may receive an unnecessary response signal from the plurality of second detectors 120. In this case, the unnecessary response signal and the response signal RS of the plurality of first detectors 110 may collide with each other, thereby reducing the reliability of the response signal RS. In addition, the plurality of second detectors 120 may transmit unnecessary response signals, and thus the battery power may be consumed. However, according to the present invention, each of the plurality of first detectors 110 may be activated at every first time TM1, and each of the plurality of second detectors 120 may be activated at every second time TM2. The activation times of the plurality of first detectors 110 and the plurality of second detectors 120 may be different. When the user checks whether the plurality of first detectors 110 installed in the first building BD1 (see FIG. 1) are operating normally, only the plurality of first detectors 110 may transmit the response signal RS. In addition, when the user checks whether the plurality of second detectors 120 installed in the second building BD2 (see FIG. 1) are operating normally, only the plurality of second detectors 120 may transmit the response signal RS. The plurality of first detectors 110 and the plurality of second detectors 120 can be activated only when necessary to conduct checking. Accordingly, unnecessary loss of battery power of the plurality of detectors 110 and 120 can be prevented. The battery time of the battery unit TT1 (see FIG. 2) of each of the plurality of detectors 110 and 120 can be improved. It is possible to prevent each of the plurality of detectors 110 and 120 from turning off at the necessary moment, and to provide the fire alarm apparatus checking method with improved reliability and the fire alarm apparatus using the same.

In the matters described above, the present invention has been described with reference to preferred embodiments, but a person skilled in the relevant technical field or a person with ordinary knowledge in the relevant technical field will understand that various modifications and changes can be made to the present invention without departing from the scope of spirit and technique of the present invention as set forth in the claims to be described later. Therefore, the technical scope of the present invention should not be limited to what is described in the detailed description of the specification, but should be defined by the scope of the claims.

INDUSTRIAL APPLICABILITY

Rapid fire response is essential in a fire prevention system. The fire alarm apparatus with improved communication reliability can be provided. Therefore, the present invention related to the fire alarm apparatus checking method and the fire alarm apparatus has high industrial applicability.

The invention claimed is:

1. A fire alarm apparatus comprising:

a plurality of first detectors, each first detector detecting an occurrence of a fire and each first detector being activated at every first time;

a plurality of second detectors, each second detector detecting the occurrence of the fire and each second detector being activated at every second time different from the first time;

a repeater that performs communication with the plurality of first detectors and the plurality of second detectors;

a receiver that performs the communication with the repeater and operates in a checking mode; and a first server that performs the communication with the receiver, wherein in the checking mode, the receiver transmits a checking signal to the plurality of first detectors or the plurality of second detectors and activated detectors among the plurality of first detectors and the plurality of second detectors receive the checking signal and transmit a response signal to the receiver.

2. The apparatus of claim 1, wherein each of the plurality of first detectors includes a first synchronization circuit, each of the plurality of second detectors includes a second synchronization circuit, and the receiver includes a synchronization circuit.

3. The apparatus of claim 2, wherein an internal time of each of the first synchronization circuit, the second synchronization circuit, and the synchronization circuit is synchronized based on a synchronization signal.

4. The apparatus of claim 3, wherein the first time and the second time are counted based on the internal time.

5. The apparatus of claim 3, wherein each of the plurality of first detectors is simultaneously activated at every first time based on the internal time, and each of the plurality of second detectors is simultaneously activated at every second time based on the internal time.

6. The apparatus of claim 1, wherein the checking mode operates based on an external signal provided to the receiver.

7. The apparatus of claim 1, wherein the plurality of first detectors and the plurality of second detectors operate in the same frequency band.

8. The apparatus of claim 1, wherein an activation time at which the plurality of first detectors are activated and an activation time at which the plurality of second detectors are activated do not overlap.

9. The apparatus of claim 1, wherein, when activated at the first time, each of the plurality of first detectors monitors for the checking signal for a predetermined time, and, when activated at the second time, each of the plurality of second detectors monitors for the checking signal for the predetermined time.

10. The apparatus of claim 9, wherein the predetermined time is from 2 to 6 milliseconds.

11. The apparatus of claim 4, wherein the plurality of first detectors, the plurality of second detectors, and the receiver transmit and receive synchronization signals at predetermined time intervals such that the synchronization circuit included in each of the first detectors, the second detectors, and the receiver does not have an error of 0.1 seconds or more in 24 hours.

12. The apparatus of claim 1, wherein the first time corresponds to a first activation interval between successive activations of each first detector, and wherein the second time corresponds to a second activation interval, different from the first activation interval, between successive activations of each second detector.

13. The apparatus of claim 12, wherein the first activation interval is 6 seconds, and the second activation interval is 6.1 seconds.

14. A fire alarm apparatus checking method comprising:

a step in which a plurality of first detectors are activated at every first time;

a step in which a plurality of second detectors are activated at every second time different from the first time; and a step in which a receiver operates in a checking mode, wherein the step in which the receiver operates in the checking mode includes a step in which the receiver transmits a checking signal to the plurality of first detectors or the plurality of second detectors, and a step in which activated detectors of the plurality of first detectors and the plurality of second detectors receive the checking signal and transmit a response signal to the receiver.

15. The method of claim 14, further comprising:

a step in which internal times of the plurality of first detectors, the plurality of second detectors, and the receiver are synchronized.

16. The method of claim 15, further comprising:

a step in which the first time is counted based on the internal time; and a step in which the second time is counted based on the internal time.

17. The method of claim 15, wherein the step in which the plurality of first detectors are activated at every first time includes a step in which the plurality of first detectors are simultaneously activated at every first time based on the internal time, and the step in which the plurality of second detectors are activated at every first second time includes a step in which the plurality of second detectors are simultaneously activated at every second time based on the internal time.

18. The method of claim 14, wherein the step in which the receiver operates in the checking mode includes a step in which the checking mode is activated based on a signal provided from the outside.

* * * * *